Jan. 15, 1935. M. EWALD 1,987,611
PEELING MACHINE
Filed Aug. 29, 1928 7 Sheets-Sheet 4
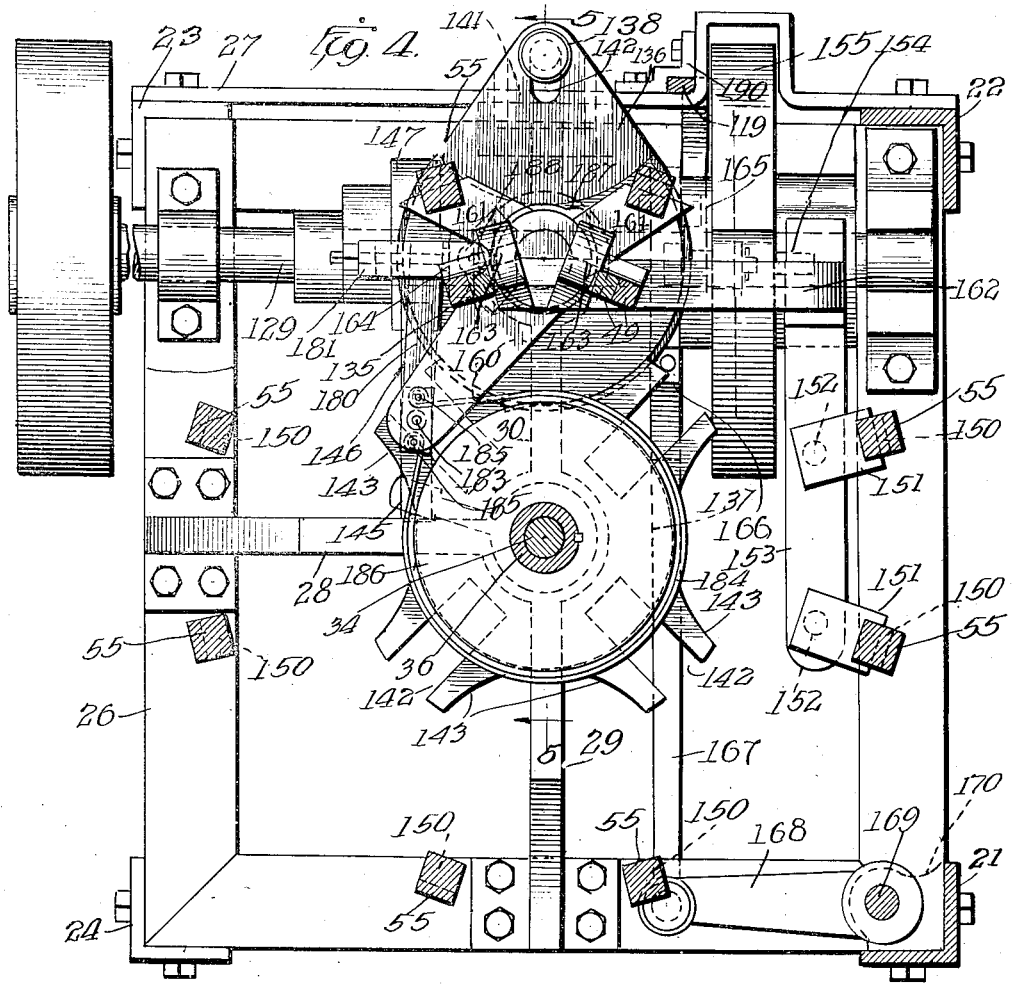
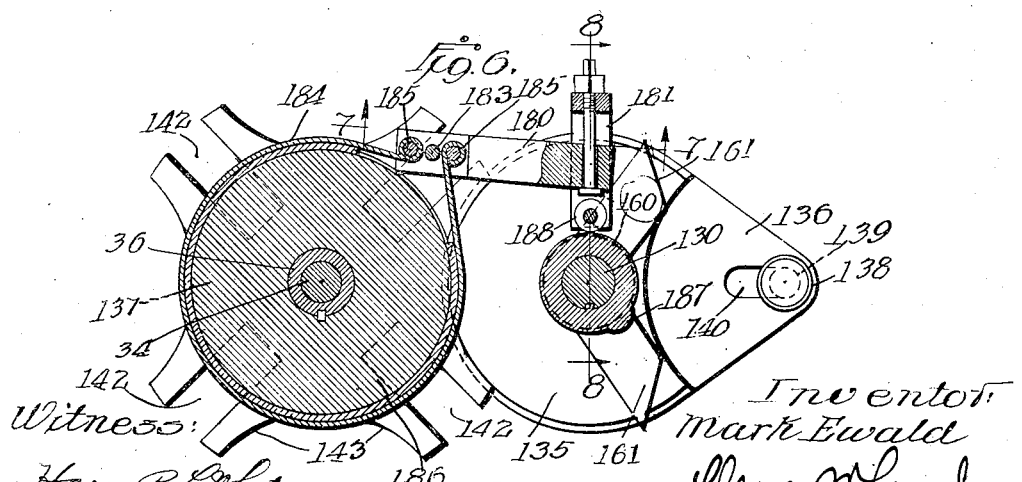

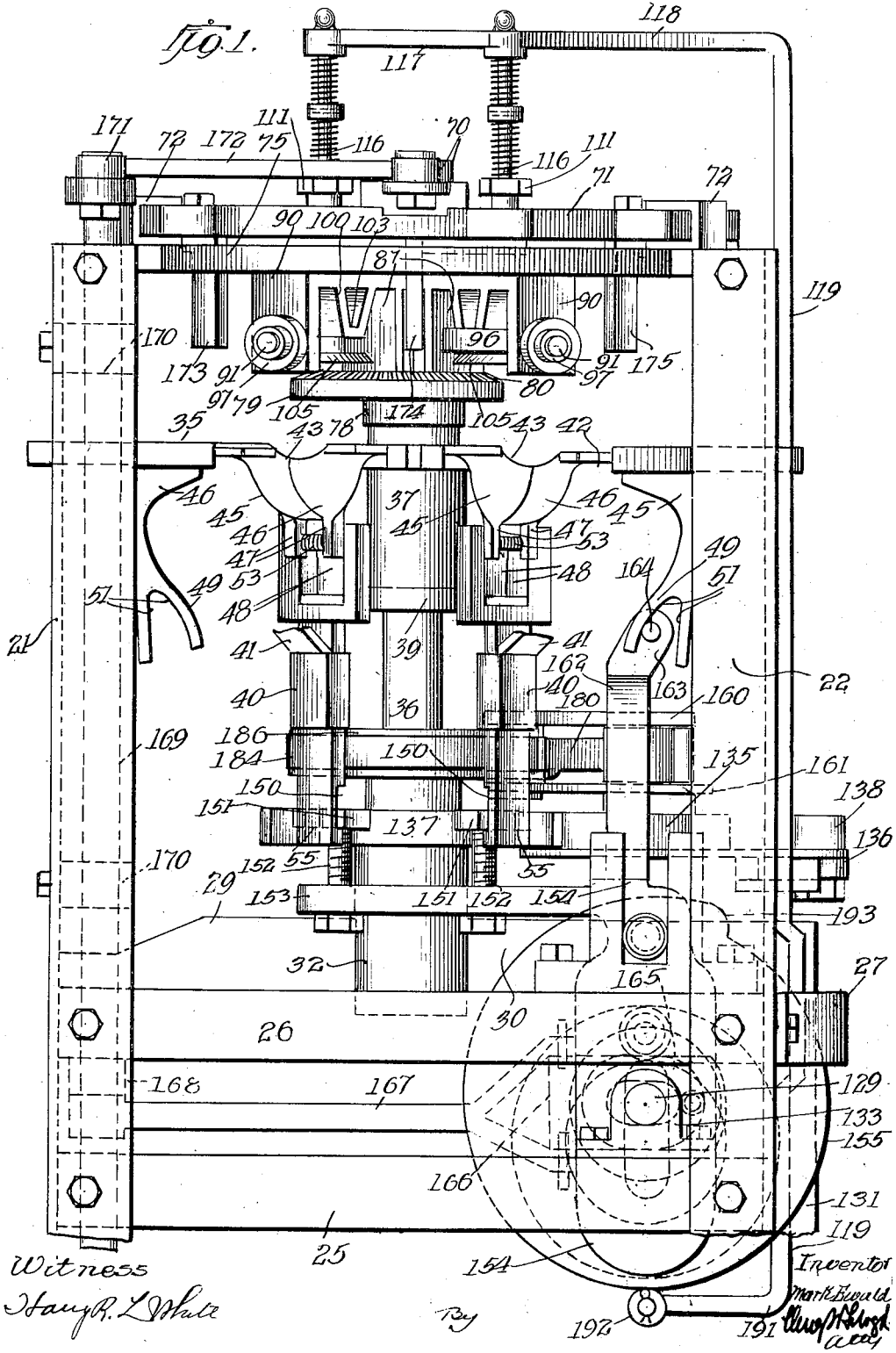

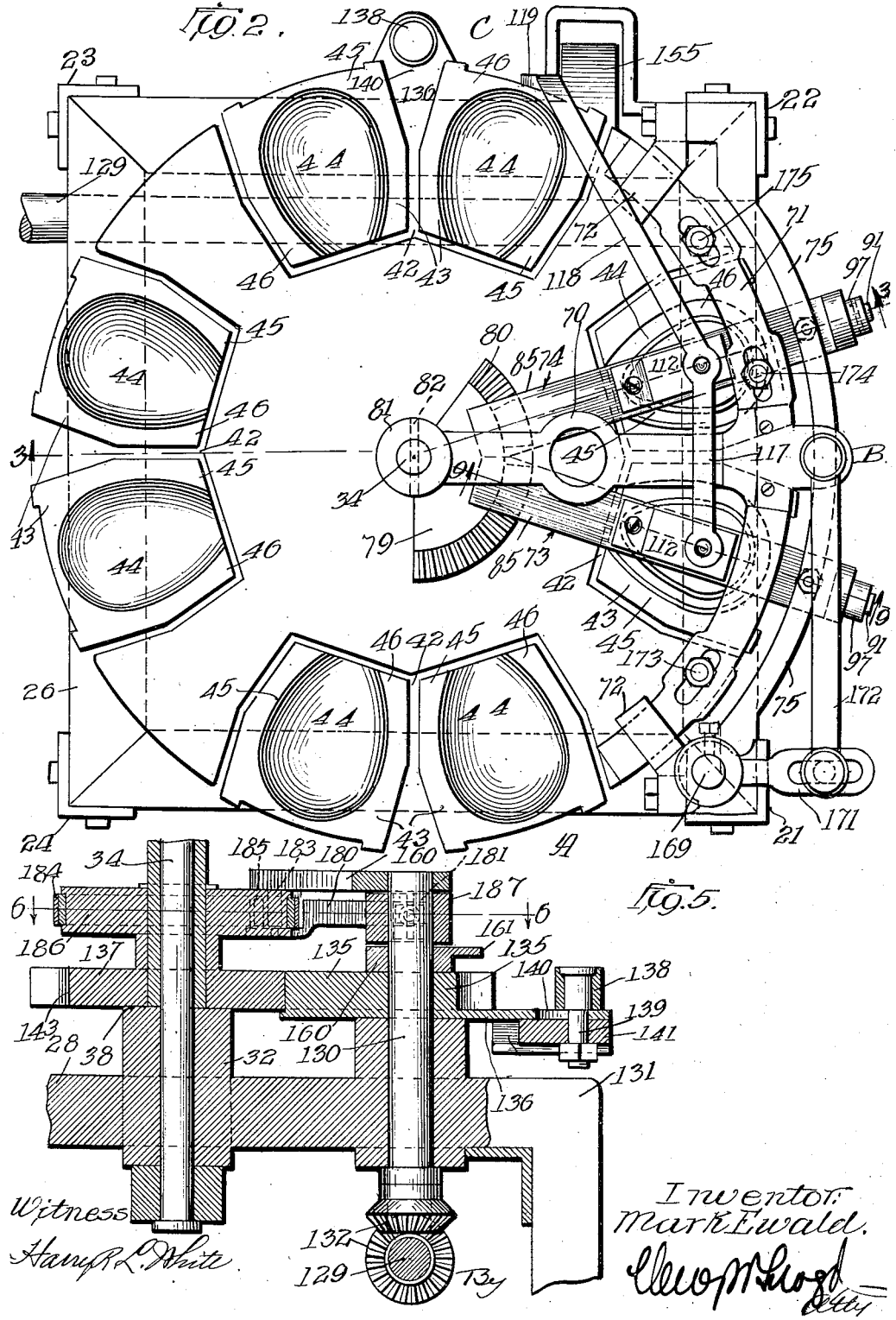

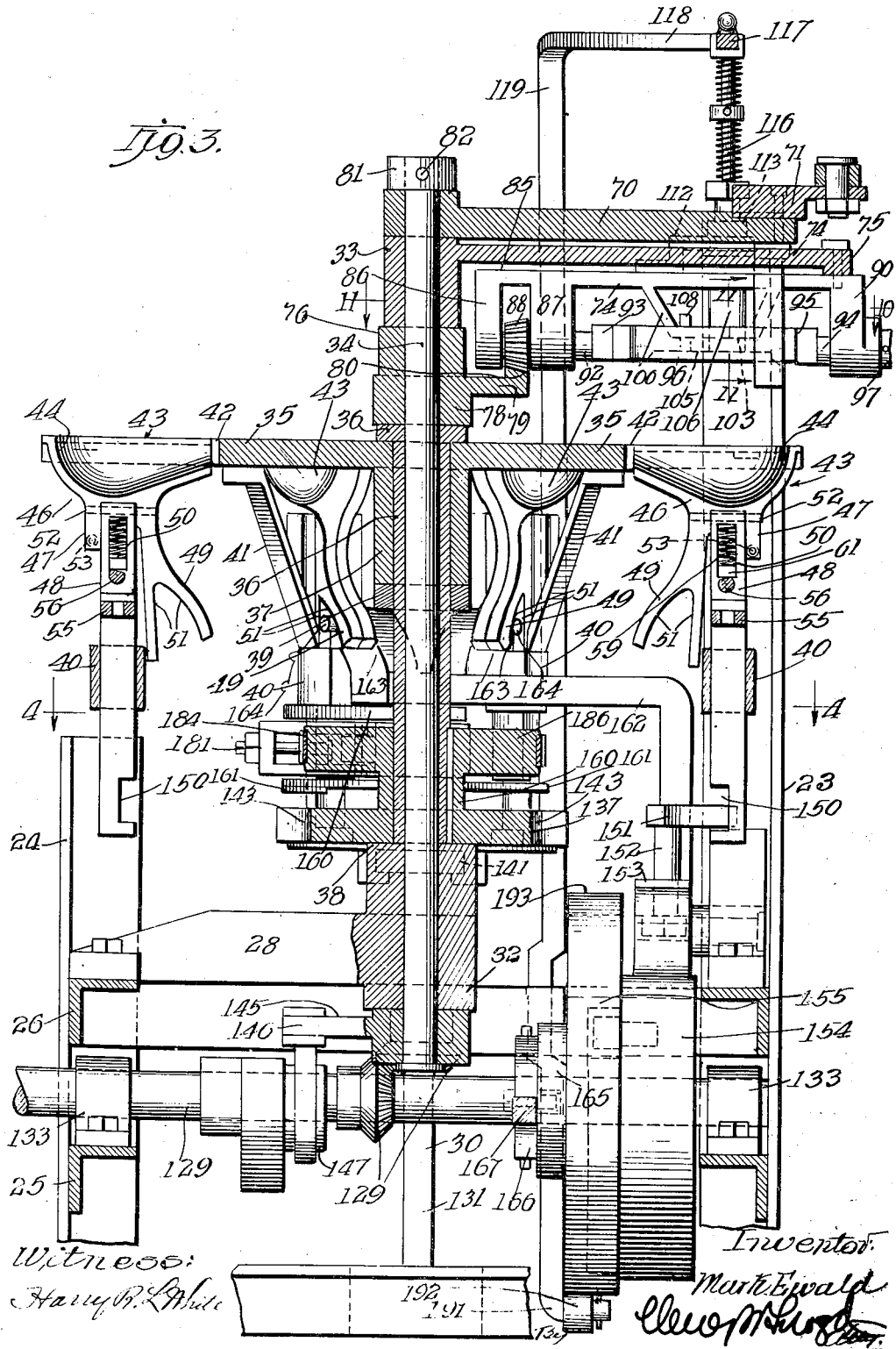

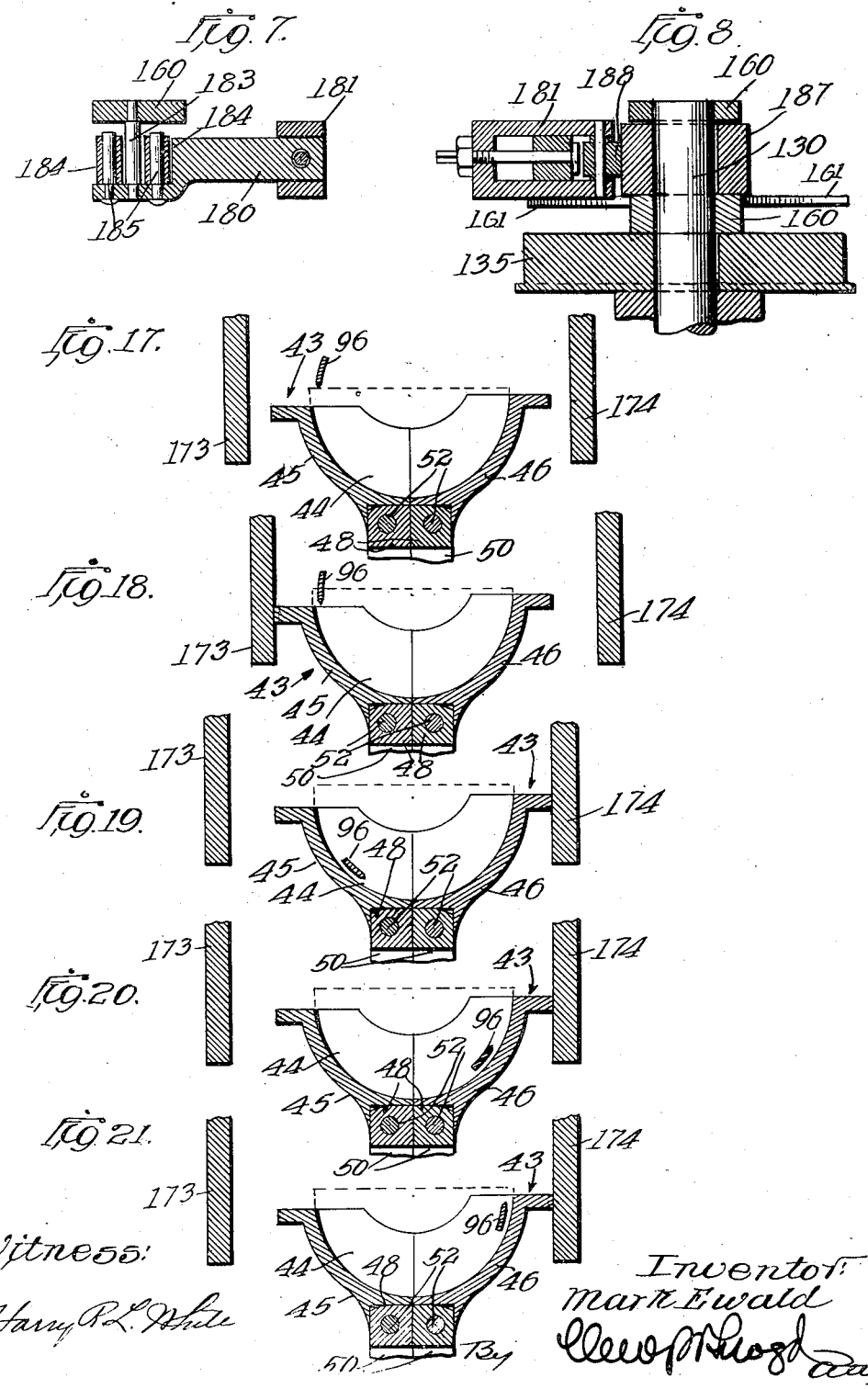

Jan. 15, 1935. M. EWALD 1,987,611
PEELING MACHINE
Filed Aug. 29, 1928 7 Sheets-Sheet 6
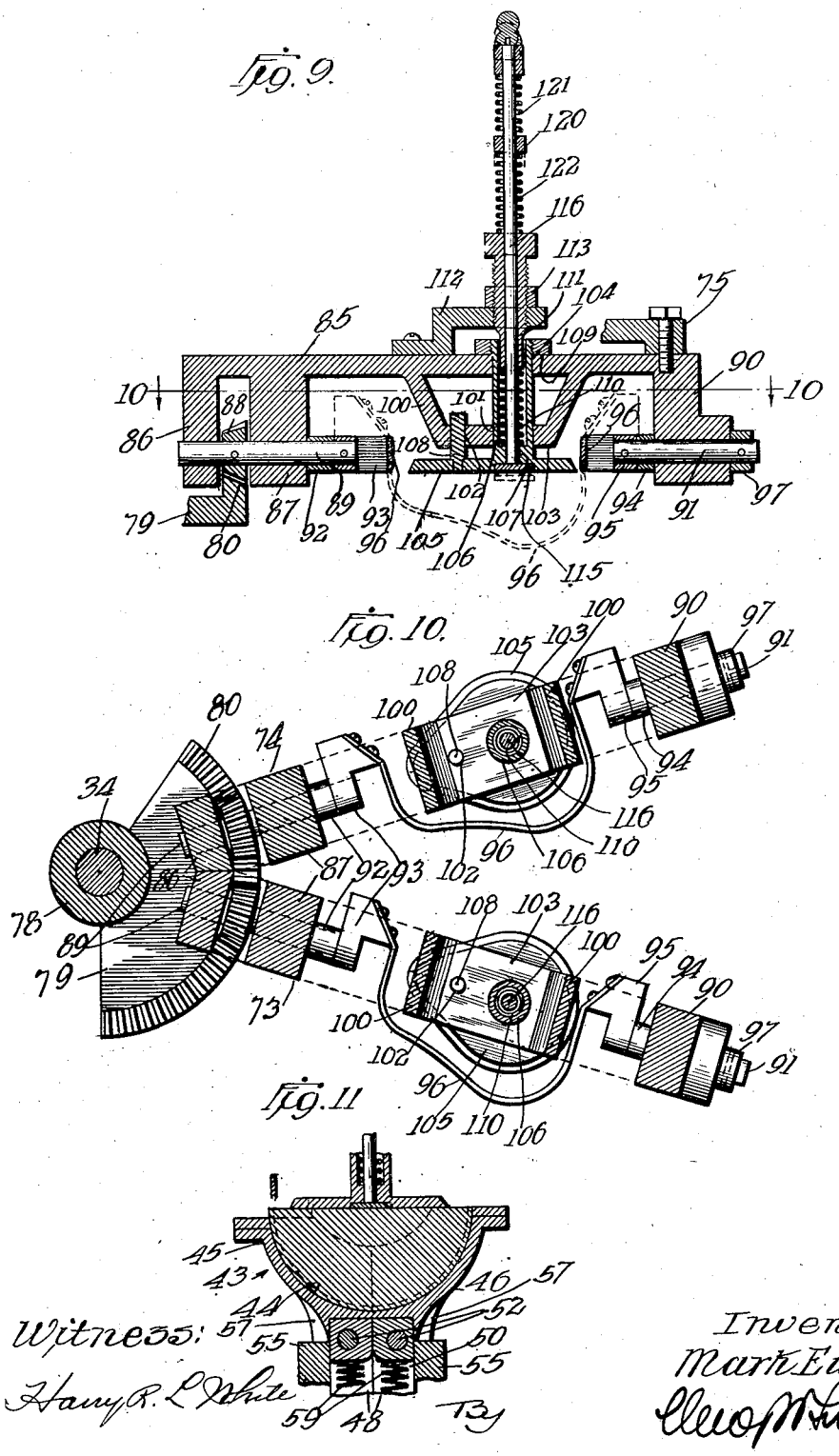

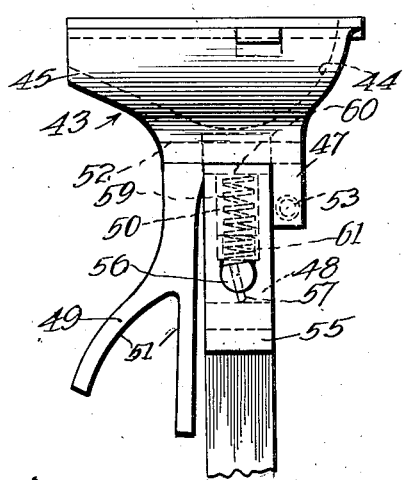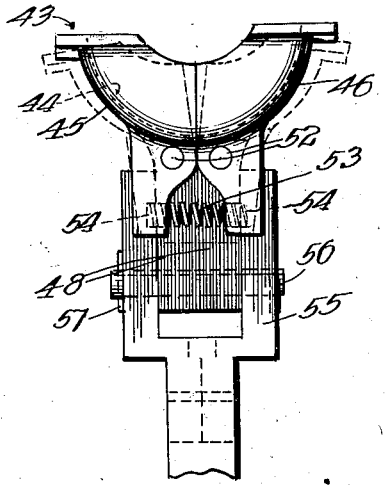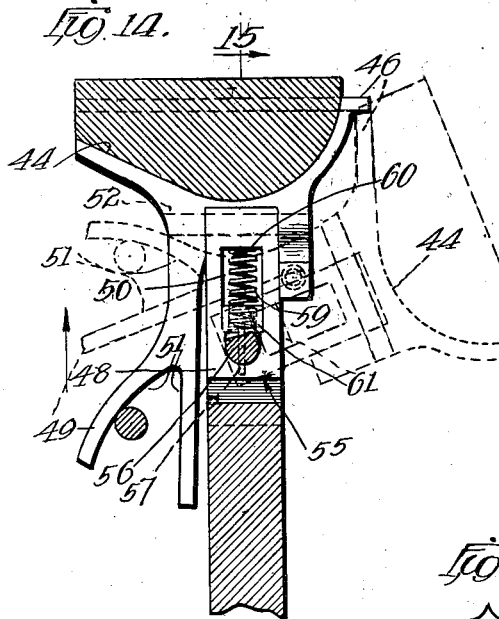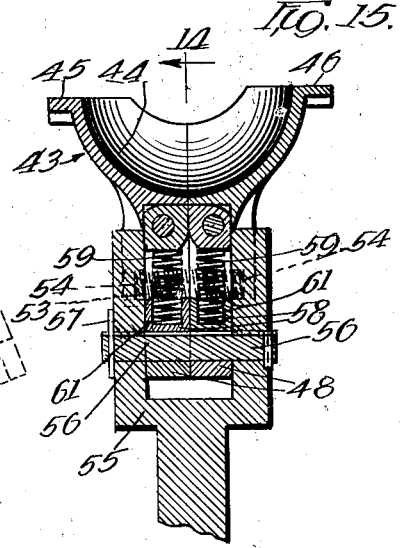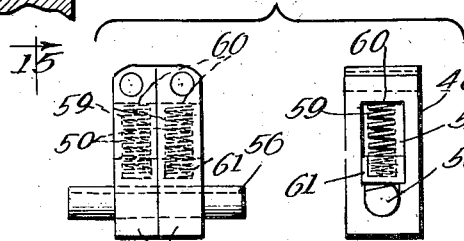

Patented Jan. 15, 1935

1,987,611

UNITED STATES PATENT OFFICE 1,987,611

PEELING MACHINE

Mark Ewald, Olympia, Wash., assignor to Special Equipment Company, Portland, Oreg., a corporation of Oregon Application August 29, 1928, Serial No. 302,712

32 Claims. (Cl. 146—43)

This invention relates to a peeling machine operating generally as the types of machines disclosed in my heretofore made applications for Letters Patent, serially numbered 187,158 and 234,676, filed April 28, 1927, and November 21, 1927, respectively, and entitled "Peeling machine" and "Coring machine", respectively.

Primarily, the subject matter of the present application is improvement of and refinement over the devices previously disclosed. Mechanically, the present device possesses numerous mechanical differences over the earlier machines, but retains in its entirety the principle of the rotating knife, the split cup, and retaining pad which made mechanical pear peeling possible.

In the earlier applications for Letters Patent, above referred to, a machine which has particularly to do with the provision of a split or segmental cup to receive a half pear or other fruit, a plate or other part to maintain the fruit in such cup split face up during peeling, and a knife to remove the peeling from the fruit at one continuous stroke of approximately 180° while in the cup and so held, is illustrated and described. The cup and the plate remain in surface contact with the fruit during the entire paring operation, and the fruit remains in such cup until after such paring stroke has been completed. The present device operates through identically the same cycle.

In the previously referred to applications for Letters Patent, the profound advantages of a pear peeling machine, the structural features of which are adapted to be employed for the paring of other fruits, have been fully discussed, and the present application will therefore devote itself entirely to a discussion of the advantages to be had by the herein illustrated refined and improved construction, and with the description and definition of such refinements and improvements.

In the earlier application for Letters Patent identified above, that part which was employed for the purpose of maintaining the fruit in a cup during the interim that it was undergoing peeling, was a solid plate or pad, while that same part described in the latter above-referred-to application for Letters Patent had added thereto an instrumentality which was designated a "knockout." The tendency on the part of fruit to adhere to the part mentioned after the peeling operation had been completed, was overcome by the employment of such knockout.

In the present application, a structure which will be referred to herein as a "floating pad" or "floating pad assembly" is illustrated. This takes the place of the original pad, and of the pad and knockout, to marked advantage.

The primary object of such floating pad is to provide means whereby the peeled fruit may be separated from adhering contact with the surface of the holding pad, mechanically, and without physical damage, when the peeled fruit adheres thereto, which it may sometimes do under conditions not readily controllable by the operator, and the secondary object thereof is to secure the detachment of such fruit from the pad by separating forces of different characteristics. In the selection of springs such as are here illustrated, two entirely different spring actions are involved, one automatic, the other forced, and the tension of the spring in each instance is different.

Although in the previously filed applications for Letters Patent, a flexible cup structure was disclosed, the present invention provides for a further improvement in such structures in greatly increasing the flexibility thereof. One of the purposes of such increased flexibility is the provision of means whereby the thickness of the peel of the fruit which is removed by the knife may be controlled. It is perfectly manifest and obvious that no more of the flesh of the fruit to be peeled should be removed with the peel than is absolutely necessary for depriving the fruit of its epidermis. A flexibility for the fruit holding cup and the other parts of the device is herein provided whereby a very thin layer only of the meat of the fruit is removed with the peeling. The efficiency and the effectiveness of the device is thus greatly enhanced.

Included in the objects of the invention, therefore, is a new and improved cup structure increasing the flexibility thereof.

There is also included in the objects of the invention a physical combination comprising means for manipulating a fruit holding cup so that the thickness of the peel removed from fruit may be further regulated and controlled.

A further object of the invention is to provide a combination of parts whereby a fruit, such as a pear, may be peeled, the cup holding such fruit being adapted to move during the process of paring in order to regulate the amount of fruit meat removed by the peeling knife and to reduce such amount to a minimum.

Another object of the invention is to provide a sectional fruit receiving cup of a new and improved design.

A machine of the character illustrated in the heretofore filed applications for Letters Patent and in the present application is quite a weighty device. When used at its designed speed, fifty cycles or more a minute, or the speed at which successful manual feeding may be employed, there is considerable wear and tear upon the machine incident to the necessity for quick starting of the parts and for the quick stopping thereof. With each quarter revolution of the device, it is necessary to place pairs of fruit cups so that they are directly beneath rotating knives. Such positioning necessarily must be fairly accurate in order that the knives may function at their highest efficiency, and remove but a limited portion of the flesh of the fruit.

To reduce the wear and tear upon the machine, efficient braking means have been added to the device, and therefore, included in the objects of the present invention, is the application to a machine of the character herein described of means for effectively stopping the device at each quarter turn without undue jarring.

Another object of the invention is to provide a new, novel and efficient braking means for use with a device of the character illustrated.

A still further object of the invention is the provision of an unique braking means adapted to be employed in connection with any apparatus subject to quick starting and stopping and where the movement of the device from the point of starting to the point of stopping is relatively short, that is, as in the present instance comprising but a fraction of a revolution of the device.

A general object of the invention is the provision of an improved pear peeling instrumentality in which it is possible to employ a relatively small number of different sized cups and other parts for the different sizes of pears which are canned, the capacity of any single set of cups and complemental parts to operate efficiently being enlarged by the present device to admit of excellent peeling of different fruit varying as much as three-eighths of an inch in the diameter thereof. In this manner the number of different sizes of pear cups and complemental parts for caring for a pear pack is greatly reduced, for under the older methods of machine peeling, it was necessary, for obtaining the degree of efficiency attained by the present machine, to employ cups which very closely approximated the precise size of the pears to be peeled therein. The present improvement results in greater latitude in the grading of the pears anterior to peeling, making such grading a less precise and expensive operation. It also reduces the amount of capital necessary to be invested in a canning plant in which pears are machine peeled because the number of interchangeable cups and complemental parts, or the number of machines provided with different sized cups is materially reduced.

These, and such other objects, as may hereinafter appear, are attained by the combination, arrangement and construction of the various parts shown in the embodiment of the present invention illustrated in the accompanying seven sheets of drawings, in which:

Figure 1 is a side elevation of a pear peeling machine embodying the subject matter of the invention, the side illustrated being that side upon which the pads and knives are located;

Figure 2 is a plan view of a machine such as is shown in Figure 1;

Figure 3 is an irregular transverse section of a machine like that shown in Figures 1 and 2, taken in the line 3—3 of Figure 2;

Figure 4 is a horizontal section of the machine on the line 4—4 of Figure 3;

Figure 5 is a fragmentary vertical section on the line 5—5 of Figure 4;

Figure 6 is a horizontal section on the line 6—6 of Figure 5 and discloses the brake mechanism;

Figure 7 is a fragmentary vertical section on the line 7—7 of Figure 6;

Figure 8 is a similar section on the line 8—8 of said Figure 6;

Figure 9 is a fragmentary vertical section showing the floating pad assembly and on the line 9—9 of Figure 2;

Figure 10 is a fragmentary horizontal sectional view of the cups and pads and is taken on the line 10—10 of Figure 9;

Figures 11, 12, 13, 14, 15, and 16 are views relating to the improved flexible fruit holding cup and its assembly; Figure 11 is a transverse view thereof at the point of its greatest diameter and showing its relation to the floating pad assembly; Figure 12 is a side elevation of a cup and cup assembly; Figure 13 is a front elevation thereof; Figure 14 is a longitudinal section through the center thereof and on the line 14—14 of Figure 15, the cup and assembly being shown in dotted lines to indicate its discharging position; Figure 15 comprises a vertical section on the line 15—15 of Figure 14; and Figure 16 comprises end and side views of a spring mechanism employed in conjunction with the assembly of said cups; and Figures 17, 18, 19, 20 and 21 are transverse sections through the improved fruit holding cup and the peeling knife and the cup shifting arms which illustrate the relative movements of the cup with repect to the knife during the paring operation, and disclosing schematically how the thickness of the peel of any fruit contained within the cup and acted upon by the rotating knife is affected by movement of the cup relative to the knife.

Like reference characters are used to designate similar parts in the drawings and in the description of the invention which follows.

As in the previously filed applications, the frame which is employed may comprise any suitable construction, and which could well be cast, but which is illustrated as consisting of four vertically disposed angle irons 21, 22, 23, and 24, which angle irons constitute corner pieces for the machine. Frame members 21 and 22 are of greater height than members 23 and 24. Said corner members 21, 22, 23 and 24 are maintained in a fixed and spaced relation by a series of horizontally disposed angle irons 25 fixed to the corner members 21, 22, 23 and 24, and which extend about the frame in the same horizontal plane.

Additional transverse members 26 extend about the frame in the same horizontal plane, but there is no member 26 between the uprights 22 and 23 where a strap member 27 is substituted therefor, said strap member 27 being in a more elevated horizontal plane than members 26 and clearing the gearing and clutches forming a part of the driving mechanism of the device and a supporting bracket disposed on the member 25 thereunderneath. Suitable bolts are arranged between the frame members to obtain sufficient rigidity for supporting the mechanism now to be described.

An angular bracket 28 extends from above the cross member 25 intermediate the uprights 22 and 23 inwardly of the machine to provide a support for a revolving table carrying fruit holding cups. Said bracket 28 may be secured, by bolting or otherwise, to one or more of members 26 for adding rigidity and strength thereto, such attachment being by radial arms 29 and 30 of bracket 28 which terminate above the frame members 26 to which they may be attached in any suitable manner such as by bolt fasteners which are of a standard type.

In said bracket 28 is a vertical bearing 32. This is the lower bearing for the cup carrying table sleeve and knife actuating shaft. Any other suitable means could be employed for supporting said bearing. A second vertically disposed bearing 33 later to be more fully described, is provided above said first bearing 32 and is supported by a radial member projecting inwardly of said frame from an arcuate cross member disposed adjacent the top of members 21 and 22. A centrally disposed shaft 34 is journalled in said upper and lower bearings as indicated for reciprocating rotary action.

A table 35 comprising a substantially circular disk having removed sections therein at 90 degree angles to one another is rotatable with a tubular sleeve 36 which rests upon the top horizontal surface of bearing 32 in axial alignment with and about shaft 34. The table 35 has a hub 37 which slidingly impinges upon a peripheral shoulder 38 provided at the top extremity of said bearing 32.

Any desired means may be employed to retain the table 35 in its proper vertical position upon sleeve 36. This is accomplished in the present instance by a collar 39 detachably fixed to said tubular sleeve 36 to support the hub 37 of the table 35 at its bottom, the top of said sleeve 36 having a lugged head against which the table 35 is closely forced. By this arrangement, movement of the table 35 in unison with the tubular sleeve 36 is obtained.

A series of circumferentially spaced bearings 40 are disposed beneath the table 35. Said bearings 40 are suspended by means of brackets 41 attached to the table 35 in any suitable manner.

As previously indicated, the face of the table 35 is provided with a series of four openings 42 of irregular shape, having somewhat the contour of the letter M, and spaced 90 degrees apart about the periphery of said table. In this instance, the openings 42 in the generally circular table 35 are adapted to receive a pair of fruit receiving and discharging cups.

Said openings 42 are well filled by said pair of properly shaped article sustaining members or cups 43, each having a concavity 44 therein of any desired configuration and which, in this instance, simulates the shape or peripheral contour of a half pear. It is obvious that other shapes may be employed to accommodate different fruits.

The article sustaining members 43 are preferably of segmental construction consisting of complemental sections 45 and 46, the latter being deeper, (see Figures 17 to 21 inclusive) and which terminate in a fragmentary peripheral flange which is broken away at the ends of the sections 45 and 46. The purpose of such flange is merely to expedite manual loading of the cups.

Each of the halves 45 and 46, the former being a left hand and the other a right hand segmental cup, (Figures 17 to 21 inclusive) comprises a short depending shank 47 (Figures 12 to 15 inclusive), the side elevation of which is probably best shown in Figure 14.

Intermediate each pair of said shanks 47 is a pair of pivot blocks 48 in parallelism and comprising a generally rectangular member possessing a centrally slotted section 50. One of said segmental cups has a depending projection 49 comprising a bifurcated cam surface 51.

The depending shanks 47 upon each of said cups 45 and 46 are adapted to extend about the top of the pivot block 48 supporting such segmental cup to provide end bearings for a screw or bolt 52 passing through the ends of said shank 47 and through the aligned pivot block 48 to provide a journal for expansive rotative movement of the half cups 45 and 46, such rotative movement being away from one another to permit of a limited spreading of the halfcups when containing an oversize section of fruit.

To maintain said parts 45 and 46 close together and in vertical alignment, a coil spring 53 is employed intermediate the depending shanks 47, the opposite ends of which spring 53 are seated in complemental opposed pockets 54 in each of the shanks 47 of said half cups. Such spring 53 is necessarily below the pivots 52 of the half cups, 45 and 46.

Normally extending about the pair of pivot blocks 48 is a bifurcated member 55 having a downwardly extending shank, later to be more fully described, to provide a locking device for the half cups 45 and 46 while pears are being discharged therefrom as well as to cooperate with a cup lifting mechanism for advancing the pears to a position for paring.

To function perfectly, in addition to being spreadable, the segments 45 and 46 should have relative vertical movement when necessary. This flexibility is attained by providing the open section 50 in the pivot blocks 48, such slotted or open section terminating in a rounded bottom.

Across the slot or open portion 50 of each of the paired blocks 48, a single flat sided bolt 56 is fastened, such bolt being anchored in the opposite sides of said bifurcated member 55 by a pin 57 seated in a groove in said member 55 so that the said flat side is always slightly angular to a truly horizontal plane.

Within the space in said slots 50 above the bolt 56 is disposed a single flat bottomed keyway 58. This member is urged, at all times, in the direction of the bolt 56 by a pair of like springs 59, one in each of the slots 50. Pockets 60 are provided at the head of said slots 59 and complemental pockets 61 are formed in said keyway 58 to prevent the springs 59 from being accidentally displaced.

A greater pressure upon one of the segmental cups 45 or 46 may be compensated for in that either half cup may be depressed beneath the other in proportion to the variation of the impressed force upon each halfcup. The half cups 45 and 46 are thus made to provide for relatively sliding movement. The keyway 58 serves further to keep said pivot blocks 48 and the depending cups thereupon in constant longitudinal alignment, and prevents angular separation, while the bifurcated member 55 in which said pivot blocks 48 are disposed prevents their departure from constant parallelism by closely engaging at all times a major section of the outer surfaces thereof.

The right-hand half cup 46 is about one-eighth of an inch higher, structurally, than the left-hand cup 45. This is necessary to give to the fruit an additional support as the knife finishes its paring cut, and it results in a very sharp or clean cut edge upon the pared fruit. Of this function, more will be said later.

The springs 59 are made with a standard tension. By proper adjustment of the adjusting screws hereinafter referred to in connection with the floating pad assembly, a setting is obtained that will allow the floating pad to be lifted by the fruit before the springs 59, Figures 12 to 15, are compressed. This allows the knife to always pass the same distance from the bottom of the cup halves 45 and 46, thereby always taking the same thickness of peeling from the fruit.

The means for raising the cups to the paring position, the manner in which they are locked against elevation during unloading, and the production of intermittent motion for table 35 will later be explained.

To remove the epidermis from articles placed in the sustaining members or cups 45 and 46, it is necessary to provide means whereby to maintain the articles therein against rotative movement.

Reference will now be had to Figures 1, 3, 9, and 10, which illustrate in detail the floating pad assembly.

In the present invention there is a radial arm 70 which is bolted to an arcuate sliding frame member 71 which extends from and works in shoes 72 in uprights 21 and 22, and which oscillates on the top of shaft 34. Just therebeneath is a pair of angularly disposed radially extending brackets 73 and 74 suspended intermediate the center of the device and the frame members 21 and 22 by a transverse arcuate frame member 75 which latter member is firmly bolted to said frame members. Said radial brackets 73 and 74 above the table 35 provide the support for the vertical upper bearing 33 of the shaft 34. Beneath said bearing 33 is a collar 76.

Between the top of sleeve 36 to which the table 35 is secured and the collar 76 is a collar 78 secured to the shaft 34 to rotate therewith and having two extending brackets 79, the top end surface of each of which is provided with gear teeth, such end being hereinafter called the rack 80.

As shown, the shaft 34 projects entirely through the bearing 33 and above the arm 70. The extremity of the shaft 34 is provided with a collar 81 detachably fixed thereto by virtue of a set screw 82 of standard construction.

It is to be noted that the legs 73 and 74 joined by the V-shaped member 75 are so related that they correspond with the spacing of each pair of article sustaining members 43. Upon each of said legs there is provided a frame or housing 85 which is substantially flat on top (see Figure 9).

At its inner end of each leg 73 and 74 of the V-shaped bracket is a bearing block 86 and a bearing block 87 between which blocks is a pinion 88 meshing with a rack 80 and secured to a stub shaft 89. At the other end of each leg 73 and 74 is a lug 90 providing a bearing block for a second stub shaft 91. At the outer end of stub shaft 89 is a separate collar or block 92 and adjacent thereto and at the extreme end of said shaft is a knife block 93. A similar block or collar 94 is provided on shaft 91 and secured thereto adjacent said collar 94 is a knife block 95. Between said blocks 93 and 95 a knife 96 of strap material is firmly secured for rotation with shaft 89. The free extremity of the stub shaft 91 is fitted with a retaining collar 97 to prevent, in combination with collar 94, axial movement of said shaft 91 within its bearing 90.

The mounting means or blocks 93 and 95 are provided with inclined diverging surfaces as shown to receive thereon the substantially flat metallic ribbon or knife blade 96 secured thereto by means of any suitable fasteners. The strap or blade 96 is bent intermediate the ends thereof to assume a shape corresponding with the interior contour of the cups 45 and 46 whereby the blade 96 constitutes a cutter adapted to sever the skin of an article sustained within the cups 45 and 46, the edges of the blade 96 being ground or otherwise shaped to enable the clean cutting of the epidermis from the article.

Intermediate the ends of the housings 73 and 74 is a depending pan-shaped sub-housing 100, having two apertures 101 and 102 through the bottom face 103 thereof. Through the larger aperture 101 and through an aligned opening 104 in each leg 73 and 74, a pad 105 having a tubular upward extension 106 is reciprocally mounted. The pad 105 has a substantially central aperture 107 therethrough, such aperture being axial with the tube 106 but smaller, and a stem or leg 108 adapted to be inserted into aperture 102 in sub-housing bottom 103. Perfect alignments of pad 105 with the cups is thus maintained.

The pad 105 is shaped to correspond with the peripheral edge of the concavity 44 but is slightly smaller in size with respect thereto to permit the knife 96 to travel freely therearound.

The pad 105 may be cast in one piece in different sizes with its hollow stem 106 of uniform size. Said stem, as indicated, is mounted to reciprocate vertically in its supporting frame. A nut 109 is threaded to the top of the stem 106 to permit the face of the pad 105 to be held in a position below normal. This is to take care of a piece of fruit that may be split in two above or below its longitudinal axis. In this way compensation is arranged for oversize or undersize halves of fruit.

A compression coil spring 110 is placed in the hollow stem 106 to give a downward pressure upon the pad 105. This spring may not urge the pad beyond the limit provided by nut 109. The upper end of the coil spring 110 is in contact with a hollow adjusting tube 111, adjustably mounted on a bracket 112 secured to the top of each leg of member 77 and is locked in position with a lock nut 113 bearing against said bracket.

By the adjustment of the tube 111, proper tension may be applied to the spring 110 upon the pad 105 whereby to allow certain relative action with respect to the springs 59 in the feed cups 45 and 46.

Through the recess 107 in the pad 105, a small generally round knockout pad 115 is fitted. To such pad 115 a stem 116 is made fast. Said stem 116 passes up through the pad tube 106, the spring nut 109, and a bar 117 crossing the top of the machine and is connected to the L-like extension 118 on a vertical link or arm 119 which receives its downward motion from a cam, later to be described.

Upon the stem 116 is a collar 120 which is pinned in place. Above said collar 120 is a coil spring 121 and below said collar 120 is a second coil spring 122. If the floating pad 105 is lifted above its normal position of rest when a half portion of fruit contained in cups 43 is brought up into the peeling position, the spring 121 compresses, which allows the small knockout pad 115 to rise with the pad 105.

A little before the knife 96 finishes its peeling stroke, the bar 117 moves downwardly, with the arm 119, exerting an added pressure on the face of the half portion of the fruit which holds it firm in the cup until the knife 96 finishes its cut. After the knife 96 finishes its cutting stroke, the bar 117 continues its downward motion in timed relation with the downward motion of the cups 45 and 46 thereby insuring a quick relief of the fruit from the pad 105.

When the bar 117 rises to its normal position, the springs 121 and 122 act upon the knockout pad 115 to draw the knockout pad up into the pad 105.

In order that the operation of the device may be better understood, particularly with reference to explaining the cup shifting mechanism and table brake, it is thought advisable to depart, for the time being, from a continued description of parts, and to give a brief statement of the actuation and functions of the parts hereinabove referred to but whose operation has not been set out fully.

A driving shaft 129 best shown in Figures 1 and 3, is rotated by any suitable prime mover. An intermediate clutch of any suitable character should be installed. From said shaft 129, all of the various elements of the device are driven in timed relation, or are synchronized to coordination.

The first driven part to be taken up will be the table 35. Intermittent motion is imparted to said table 35 by virtue of a Geneva gear movement. The driving section of this gear is disposed upon a stud shaft 130 journalled in a bearing 131. Said stud shaft 130 is driven by bevel gears 132 intermediate an extremity thereof and in meshing engagement with the driving shaft 129 which latter is journalled in split bearings 133 affixed to the frame of the device.

The driving Geneva gear 135 is composed of a substantially circular portion which terminates in an extension 136 having a face thereof disposed beneath the plane of the driven Geneva cam 137.

The extension portion 136 has a roller 138 journalled on a pin 139 slidingly seated in the extremity of the portion 136 by virtue of a slot 140 therein and a slide 141 in said slot, the roller 138 being disposed in the plane of the Geneva cam 137 for periodic coaction with spaced apart slots 142 provided therein to correspond with the spacing of each pair of article sustaining members 45 and 46.

Intermediate the slots 142, in this instance four, are arcuate surfaces 143 which are in the same plane and coact with the circular portion of the cam 135 to maintain the Geneva cam 137 against rotation during the interval defined by the circumferential extent of the circular segment of the cam 135.

The table 35 will be moved a quarter of a revolution each time the roller 138 is projected within a slot 142, said table 35 in the meantime being held against movement upon engagement of the circular portion of cam 135 with the arcuate surface 143 of the Geneva cam 137, thereby imparting intermittent predetermined movement of the table 35, with periods of freedom from movement of appreciable length between each quarter turn advance of the table 35.

Said driving Geneva gear 135 has a roller 138 as indicated above, which instead of being fixed, is mounted on a slide 141, which slide reciprocates in bearings in slot 140. The slots 142 in the Geneva star 137 are not cut the usual full length as in a standard Geneva gear.

This arrangement makes for a gentler rotation of the table 35. It eliminates the highly accelerated motion general in a Geneva star at the time when roller 138, ordinarily stationarily mounted on the driving cam, engages the slots 142 therefor in the star gear.

The peeling means, constituting in this instance the two strap knives 96 mounted in brackets 73 and 74, are conjointly oscillated during each period that the table 35 is at rest. At this time one pair of the cups 43 are in registry with the floating pads 105.

The pads 105 serve to maintain the fruit or other articles contained in the cups 43 against rotary movement in the concavities 44 thereof for the fruit is first elevated to cause such fruit to contact directly with the face of said pads 105 prior to the rotation of the severing means 96 in a cutting stroke into the fruit in cups 43.

Movement is imparted to said knives 96 by the pinion fixed to the stub shafts 89 journalled in each of the brackets 73 and 74, said pinion 88 being in mesh with a mutilated gear or rack 80 which is fixed to the shaft 34.

Said shaft 34 extends downwardly and terminates in a crank arm 145 which has a cam follower 146 fixed thereto to coact with a cam 147 fixed to the shaft 34 in proper timed relation with respect to the intermittent movement of the table 35 so as to actuate the blades 96 at the proper time, this being, as indicated, the rest period of the table 35 which, as described above, is intermittently rotated, and after the cups 43 have been lifted to their highest point. Of course, through this arrangement, shaft 34 is oscillated and not continuously rotated.

With the arrangement described, the fruit or other articles are first sliced in half, or split longitudinally, and each half pear is placed in the cups 43 at station A (see Figure 2). At this time the cups 43 at station B are in registry with the pads 105. This position is attained in a manner now to be indicated.

Prior to the actuation of the paring knives 96, and as an incident to movement of a pair of cups 43 from position A to position B (see Figure 2), the pair of cups 43 containing halves of fruit are brought into vertical registry with the pads 105. (Station B, Figure 2). In the course of travel, the bifurcated holder 55 which has a grooved lower end 150 has slidingly passed into engagement with cam shoes on an arm actuated by a cup lifting cam.

Said shoes 151 are adapted to ride in the transverse groove 150 in the bottom of the cup supporting stem 55 somewhat loosely to avoid binding but securely enough to always provide for positive actuation.

Shoes 151 are at the end of an adjustable stem 152 which stem in respect to both cups 43 is seated in an horizontal arm 153 forming a part of a cam yoke 154 actuated in a vertically reciprocating manner by a cam 155 driven by the shaft 129 (see Figures 1 and 3). The cup lifting cam may be arranged at any point on the shaft 129 but is preferably placed in juxtaposition to the cup shifting cam.

By rotation of shaft 129, the cam 155 is actuated whereby the yoke 154 rises and falls and with it the arm 153 of the cup lifting cam, which arm or bar is adapted to register with the grooves 150 in said stems 55.

The cup lifting cam 155 forces the cups 43 upwardly and then downwardly, both by positive movement, maintaining the cups 43 in an elevated position for sufficient time to permit of the removal of the skins of the fruit contained therein. When the skins are removed, the cups 43 are forced downwardly, all prior to further rotation of the table 35. At the next quarter turn of the table 35, the pears with the skins detached are moved to position C, Figure 2, which is the discharge station or position.

While the cups are in elevated condition and in position B, the knives 96 are actuated to swing over 180 degrees through the concave portions 44 of cups 43 so, and during this operation, the segments 45 and 46 of said cups will be individually or conjointly depressed and/or spread simultaneously or in seriation in accordance with characteristics of the half fruit contained in the cup 43. The complementary sections 45 and 46 of the cups 43 are effective to sustain the article during the peeling operation.

Conjointly with the peeling operation, the cups 43 are moved sidewise, first in one direction and then oppositely, in order to keep the knife 96 in juxtaposition to the wall of the cups 43 to provide for the removal of but as little as possible of the flesh of the fruit with the skin. Concurrently, the sustaining members 43 containing the peeled articles after being moved to station C, are emptied in the manner now indicated. The stems 55, as they attain position C, Figure 2, register their grooves 150 about extensions 161 in a bracket 160 above the Geneva gear 135 whereby while being discharged said cups 43 cannot be lifted and can not move in alignment with the lifting force used to tilt them.

A lever 162 which may be actuated with cup lifting cam 155 and which may form a member moving with or comprising a part of cam yoke 154 is adapted to move upwardly with yoke 154 to incline the cups 43 from which the peeled articles therein contained are discharged onto a belt or other conveyor. Such member 162 is provided with two arms 163, one for each cup 43 in position C, each of said arms having a roller 164 which is adapted to impinge the cam surface 51 of cam 49 as it rises. On the dropping of cups 43, the rollers will impinge the opposite side of the forked cam 49 to restore the cup 43 to a horizontal position.

In the present invention, as hereinabove indicated, the pear cups 43 are permitted to have a side motion, which side motion is a material assistance in procuring a thin paring. Heretofore the cups have had a plurality of motions, but have not been graced with such a side motion.

Reference now should be had to the cup shifting mechanism. Figures 17 to 21 inclusive, illustrate generally what is called a side shifting mechanism for the cups 43. The lower numbered Figures, 1 and 3, show the general arrangement of such cup shifting instrumentality which materially assists in the control of the thickness of the peel removed from the fruit at the start, during, and at the finish of the knife cutting stroke. Such movement is obtained in the following manner.

Next to the cup lift cam 155 on the cam shaft 129 is placed a cup shift cam 165, which cam transmits to a cam yoke 166 the motions desired for this part of the device. These motions are transmitted through a link 167, a lever 168, a vertical shaft 169, which shaft is supported by two bearings 170, a second lever 171, and a link 172, to the anchor-shaped bracket comprising members 70 and 71, the latter being rotatable upon the central shaft 34 of the machine. At each end said member 71 is slidably mounted in the shoes 72 supported by members 21 and 22, and adjustably disposed in said member 71 are three fins, 173, 174 and 175, each of which is disposed in a slot and is secured by a locking nut. Said fins 173, 174, and 175 are brought into contact with the periphery of the cups 43 and move them sidewise as illustrated in Figures 17 to 21, inclusive. Of course, in the last mentioned views, one cup 43 only is shown, but the cups 43 in the device actually in use are acted upon conjointly and by the same mechanism.

The fins 173 and 174 are normally in the position shown in Figure 17, at the time the cups 43 are elevated, thus allowing sufficient clearance for the cup 43 containing the half portion of fruit to be peeled until it attains a position for peeling. At the moment the cup 55 has reached this position, which is against the pads 105, the fins 173 and 174 are moved over to the position as shown in Figure 18. By proper setting of the fin 173 in the slot provided therefor, the knife 96 may be made to enter the fruit at any desired point with respect to the thickness of the peeling to be taken from the fruit.

When the knife 96 shall have entered the fruit and during the interval that the knife 96 passes downwardly to the position shown in Figure 19, the fins 173 and 174 are moved in the opposite direction quickly to the position shown. At this time the cup 43 is moved sidewise by the fin 174.

During the time the knife 96 is at the bottom part of the stroke or between the position shown in Figures 19 and 20, until the knife 96 passes from the fruit, there is no further movement of the cup (see Figures 19, 20 and 21). As soon as the knife 96 passes from the fruit, the fins 173, 174 and 175 are moved quickly back into their normal position, as shown in Figure 17.

As the cup is moved to compensate for the travel of the knife 96, it is possible to have a tolerance of at least ⅜ of an inch in the diameter of the pears peeled in a single cup in the grading thereof for size. Grading of the fruit is very important in machine peeling, and heretofore while there has been relative flexibility in the cup structures, the grading had to be more accurate than in the present device, otherwise many improperly peeled pears were developed. By the present arrangement, greater tolerance is permitted. This reduces the necessity for a large number of different knives and cups, and necessarily reduces the investment of the canner in pear peeling machinery.

Figure 6, 7 or 8 shows an arrangement for overcoming the momentum of the feed table 35.

The bracket 160 which is mounted on the shaft of the Geneva gear, carries a brake lever 180 and an adjusting yoke 181. Said brake lever 180 is mounted in the bracket 160, pivoted therein with the pin 183. To the brake lever 180 a brake band 184 is made fast with the pins 185. The brake band 184 with lining attached passes around a brake drum 186.

Just before the Geneva roller 138 finishes its work of turning the star 137, a point 187 on a cam 188 rotating with the Geneva 135 forces the yoke 181 and the roller on the end thereof outwardly. This outward action sets the brake just enough to overcome the momentum of the table 35 just anterior to the time said table is about to attain its next resting position, thus reducing the jar of stopping and the coincidental wear upon the machine in its entirety.

For changing the machine from one size of pears to another, the cups 43 and the complemental knife members 96 must be changed, this being possible by merely detaching the severing instrumentality 96 from its mounting members 95. Should it be necessary to change the space therebetween, another spacing sleeve 92 or 94 of different length may be substituted, thereby enabling the desired adjustability.

Further, the floating pad structure may be removed as a unit without disturbing the remainder of the assembly should it be desired to substitute another unit therefor.

Member 119, which controls the knockout pad 115 and has as an integral or separable part thereof the arm 118, is reciprocally mounted in bearings 190 at the side of the machine. At its lower end, it has an arm 191 which terminates in a roller 192 adapted to be impinged by a cam 193 upon shaft 129, so that with the rotation of said shaft, the member 119 is moved up and down to actuate the knockout pads 115 in the manner hereinabove described.

I claim:

1. The combination with an article sustaining means, epidermis severing means having a stationary axis of rotation, and means for actuating said epidermis severing means within said article sustaining means, of means for effecting movement of said article sustaining means relatively to said severing means conjointly with the rotation of said severing means.

2. The combination with an article sustaining means, severing means rotating on a stationary axis and shaped to coact with the interior of said article sustaining means, and means for actuating said severing means, of means for moving said article sustaining means relatively to said severing means to position the interior of said article sustaining means at a predetermined distance from the path of travel of said severing means.

3. Article sustaining means having a wall of a predetermined concave shape, severing means shaped for travel in proximity to the interior surface of such wall of said article sustaining means, and means for actuating said severing means, said article sustaining means comprising segments adapted to be spaced apart to accommodate increased bulk of articles therein incident to the travel of the severing means therethrough.

4. Article sustaining means of a predetermined concave shape and comprising sections adapted to be moved relatively to one another, severing means shaped for travel in proximity to the interior of the sections of said sustaining means, and means for actuating said severing means, the sections of said sustaining means being movable to compensate for differences in the bulk of content thereof coincident to the penetration and movement of said severing means into and through an article sustained therein.

5. The combination with fruit peel severing means, of fruit sustaining means of a predetermined concave shape and comprising sections, and a flexible support for said fruit sustaining means admitting of said sections being moved outwardly one from another and reciprocatingly in parallelism coincidentally with the movement of said peel severing means through an article in said fruit sustaining means.

6. A fruit sustaining cup having a concavity corresponding in shape to the shape of a fruit receivable therein, a knife movable through the concavity in said cup, a pad cooperating with said cup to hold fruit in the latter during the movement of the knife and comprising sections, means to urge each section of said pad toward said cup, the urging means for one of said sections possessing an urging force greater than the urging force of the urging means for the other of said sections, and means for moving said cup and said pad into proximity before movement of the knife through the concavity in said cup.

7. Fruit sustaining means, means for holding fruit in said sustaining means and comprising a pad having separable sections, an epidermis severing means movable through said sustaining means when said sustaining means and said pad are in proximity, a flexible support for one of said pad sections, means for advancing another of said pad sections toward said article sustaining means, and means for moving said article sustaining means and said holding means toward one another preliminary to the movement of said severing means.

8. In combination, article sustaining means, epidermis severing means for paring an article in said sustaining means, means for advancing said article sustaining means and said severing means toward one another, a holder for the article cooperating with said sustaining means to maintain such article in the sustaining means during the operation of said epidermis severing means, said holder comprising a plurality of flexibly mounted complemental sections, one of said sections having a more flexible mounting than the other, and means for moving one of said sections toward said article sustaining means.

9. In combination, an article holding cup, epidermis severing means mounted for operation upon an article in said cup, means for sustaining an article in said holding cup during the operation of said severing means and comprising a sectional pad, a flexible mounting for each section of said pad, and means for urging one section of said pad toward said cup concurrently with the termination of the severing operation of said severing means.

10. In a fruit peeling device, a supporting frame, cup segment supporting members in said frame and adapted to move longitudinally of one another, and segments of cups on said supporting members.

11. In a fruit peeling device, a cup comprising segments, a supporting frame, cup segment supporting members in said frame and movable longitudinally of one another, segments of said fruit holding cup on said supporting members, and means for urging said segments into complemental relation.

12. In a fruit peeling device, a cup comprising segments, a supporting frame, cup segment supporting members in said frame and movable longitudinally of one another, and segments of said fruit holding cup on said supporting members, said supporting members being tiltable in said frame.

13. A fruit paring device comprising a stem provided with a track portion, a tiltable fruit holding section upon said stem, moving means engaging with said track section for lifting said fruit holding section, and stationary means also engaging said track section for holding said stem stationary while said fruit holding section is tilted.

14. In a fruit treating device, a cup to receive fruit and comprising complemental segments, a support for each of said segments, means for mounting said supports, said means admitting of relative longitudinal movement between said supports, and connecting means between each of said segments and its support providing for angular movement between said segments.

15. In a fruit treating apparatus, a fruit cup comprising segments in predetermined relationship, a support for each of said segments, means for mounting said supports in pairs and for relative longitudinal movement between the paired supports, connecting means between each segment and its support admitting of angular movement between said segments, and means for urging said segments and the supports therefor to return to their predetermined relationship after displacement therefrom.

16. In combination, a fruit holding cup comprising relatively movable segments, a rotating knife having an arcuate path through said cup during its cutting stroke, means for rotating said knife, each of said segments having a fruit supporting surface complemental to the arcuate path of said knife, the first of said segments being concentric and the second of said segments being eccentric to the path of movement of said knife when said knife enters said cup, and means operable during the rotation of said knife for changing the position of the second segment of said cup from one of eccentricity to one of concentricity with the path of said knife anterior to the passage of the knife along said second segment.

17. In a fruit treating device, a cup having a recess therein to receive fruit and having an open side in a substantially flat plane, a rotating knife mounted for travel through said cup, and means operable during rotation of said knife for moving said cup in opposite directions in such flat plane.

18. In combination, a cup having a recess therein to receive fruit and possessing an open side in a substantially flat plane, a rotating knife mounted for travel through said cup and having an axis in a plane substantially parallel to the plane of the open side of said cup, and means operable during the rotation of said knife for moving said cup in opposite directions in the plane of its open side and relatively of the axis of said knife.

19. In combination, a cup to receive a half fruit and having a recess therein conforming to the curved face of such fruit, the flat section of the fruit traversing the open side of said cup, a knife rotatable through said cup and having an axis of revolution in parallelism with and substantially within the plane defined by the mouth of said cup, and means operable during the rotation of said knife through said cup for moving the cup laterally and in opposite directions in a plane parallel to the flat face of the fruit therein.

20. Fruit treating apparatus comprising a cup having an open side, a rotary knife having an axis bisecting said cup, and means operative during the rotation of said knife for moving said cup laterally of its open side, first in one direction to a position alined with respect to said axis and then in the opposite direction.

21. The combination with a fruit receiving cup having walls, of a knife having an axis bisecting the mouth of said cup and rotatable in an arcuate path extending into and out of said cup, means for rotating said knife for moving said cup in a plane transverse of the axis of said knife, the movement of the cup adjusting the opposed walls of said cup relatively to the path of said knife as said knife travels alongside thereof.

22. In a fruit paring device, a fruit cup having an open mouth, a pad over the mouth of said cup, a knife having an axis bisecting said pad and rotatable in an arcuate path extending into and out of said cup, means for rotating said knife, and means operable during the rotation of said knife for moving said cup in opposite directions laterally of said pad.

23. In combination, a fruit holding cup comprising segments, a knife mounted for rotary movement successively past said segments while moving into and out of said cup, and means engaging said segments to move them successively into selected spaced relation with said knife as it registers therewith in passing.

24. In combination, a fruit holding cup comprising arcuately arranged segments, a knife mounted for travel in proximity to the surface of said segments in a predetermined order, and means engaging said segments one at a time for moving said segments into predetermined positions relatively to said knife preliminary to the approach of the knife thereto.

25. In combination, a knife having an axis of rotation, means for rotating said knife, a cup comprising opposed segments having fruit supporting surfaces at the interior thereof and along which said knife travels, and means for moving said segments one at a time relative to the path traversed by said knife and into a predetermined spaced relation in respect to the path of movement of said knife.

26. In a fruit treating device, a rotatable knife having an arcuate path, means for rotating said knife, a cup having segments the interior surface of which approximates the path of said knife, and means operable while said knife is in proximity to the interior surface of said segments for moving said segments one at a time toward and into predetermined spaced relation to the path of said knife.

27. In combination, an expansible cup having fruit supporting interior surfaces, a rotary knife having a path of movement approximating the interior fruit holding surfaces of said cup, and means operable as said knife progresses on its path of movement for moving said cup to shift the interior surfaces thereof toward and into a predetermined spaced relationship to the path of said knife and to maintain such inner surfaces of the cup at the same distance at all times from the path of said knife.

28. In combination, a cup comprising relatively movable segments compensating for the varying size of fruit contained therein, a knife having a cutting edge traveling through said cup, and means for changing the position of the segments of said cup to maintain the cutting edge of said knife at all times at a predetermined distance from the fruit supporting surfaces of said segments indifferently to the relative position of said segments one to another.

29. In combination, a fruit holding cup comprising segments having fruit supporting surfaces and joined at their closed sides and angularly movable from adjacent their contiguous edges for increasing the bulk capacity of said cup, a rotatable knife having a path of movement through said cup, and means for moving said cup in a plurality of directions to maintain the fruit supporting surfaces of said cup at a predetermined distance from said knife.

30. In a fruit paring device, a cup for fruit and having walls, means for mounting said cup for movement in a plurality of directions, certain of said directions of movement being normal to others, a knife having a fixed arcuate path and rotatable through said cup, movement of said cup in one direction being to compensate for increased bulk of the fruit incident to the entry of the knife thereinto, and means operable while said knife is being rotated for moving said cup successively in opposite directions normal to said first mentioned movement, the several movements of said cup being synchronized to adjust the interior of the cup relative to the path of the cutting edge of said knife to maintain the walls of said cup at a fixed distance from such cutting edge.

31. In a fruit treating device, a cup having an open mouth, and comprising segments which may be spread apart, supports for said cup and admitting of an angular spread of said segments, said supports extending from the lower contiguous edge of said segments, a knife having an axis of rotation bisecting said cup in a plane parallel to the plane of the mouth of said cup, means for rotating said knife, and means operable during the rotation of said knife for moving said segments relatively to said knife first in one direction and then in another direction in parallelism to the direction first named and in a plane substantially parallel to the open top of said cup, the movement of said segments being synchronized with the movements of said knife to compensate for the spread of said cup incidental to the insertion of fruit thereinto and to maintain the inner surface of said cup at a predetermined distance from the path of travel of said knife.

32. In a fruit treating device, a paring knife having an arcuate path of movement, a cup for holding fruit during movement of said knife therethrough, said cup comprising complemental segments normally in contacting engagement along their edges, a support for each of said segments, there being below said segments and in a plane substantially normal to the contacting edges of said segments a pivotal member admitting of angular movement of said segments relatively to one another, and resilient members for urging said segments into contact, said supports and pivotal member maintaining the bottom sections of said segments in close proximity during an angular displacement of said segments, the displacement of said segments at their tops during any angular movement thereof being of greater magnitude than the magnitude of their displacement at the bottom thereof.

MARK EWALD.